A. C. G. WILLIAMS-FOOTE.
CONVERTIBLE WHEEL FOR MILITARY AND OTHER TRUCKS.
APPLICATION FILED AUG. 12, 1913.
1,110,307.
Patented Sept. 8, 1914.
2 SHEETS—SHEET 1.
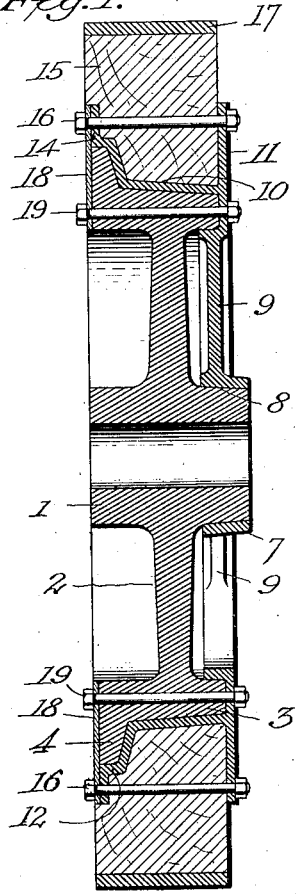
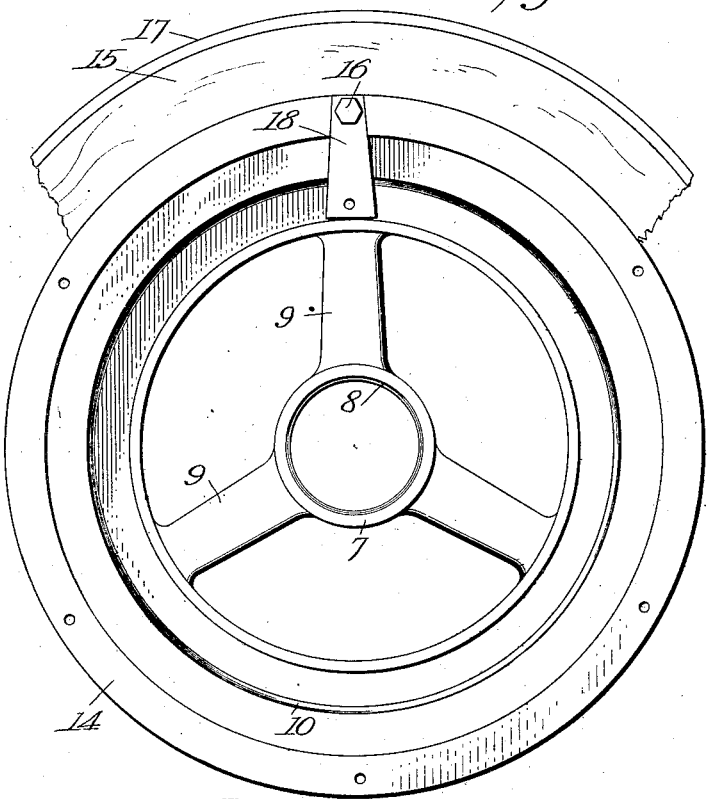
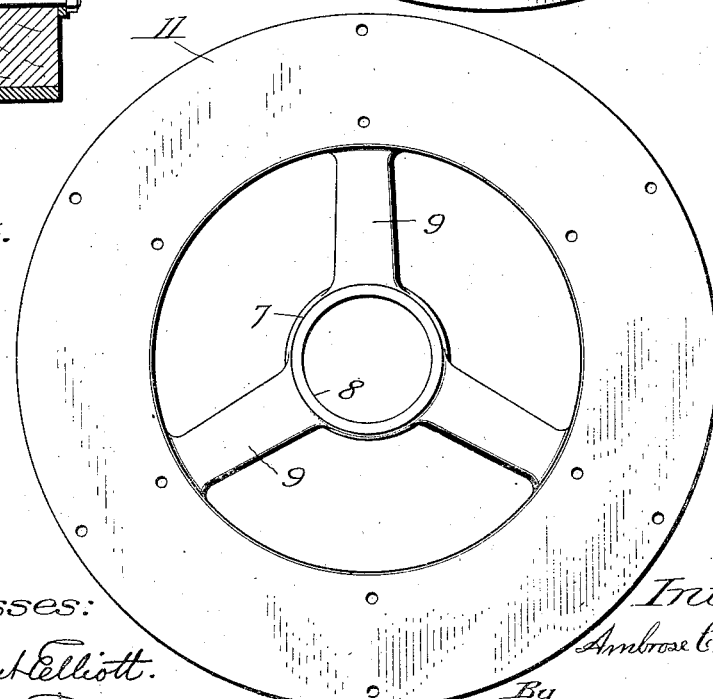
Witnesses:
G. Sargent Elliott.
Adella M. Fowle.
Inventor:
Ambrose C. G. Williams-Foote
By H. S. Bailey Attorney A. C. G. WILLIAMS-FOOTE.
CONVERTIBLE WHEEL FOR MILITARY AND OTHER TRUCKS.
APPLICATION FILED AUG. 12, 1913.
1,110,307.
Patented Sept. 8, 1914.
2 SHEETS—SHEET 2.
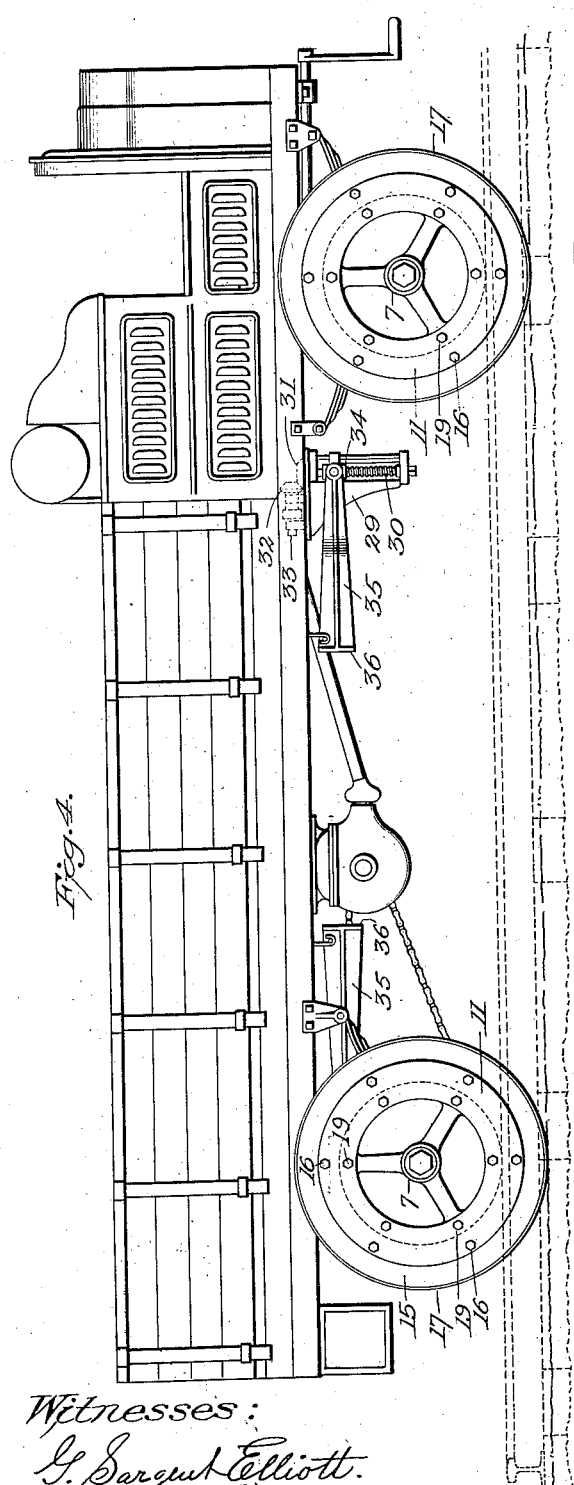
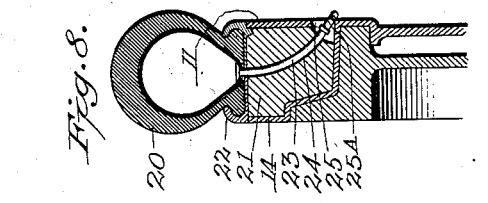
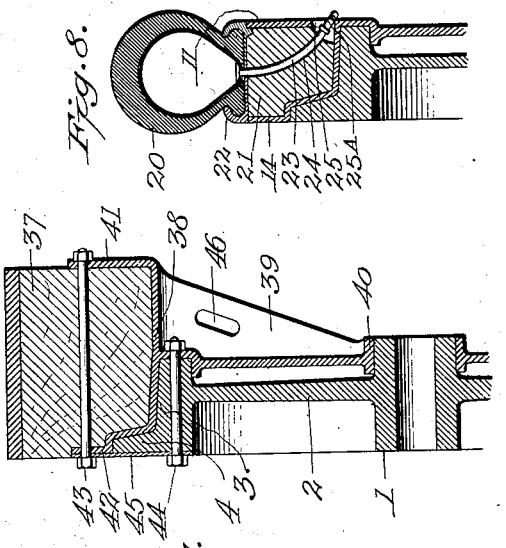
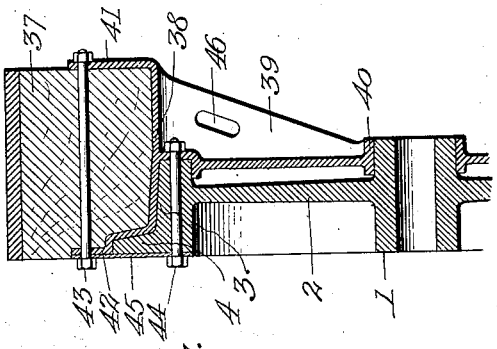
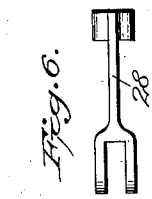
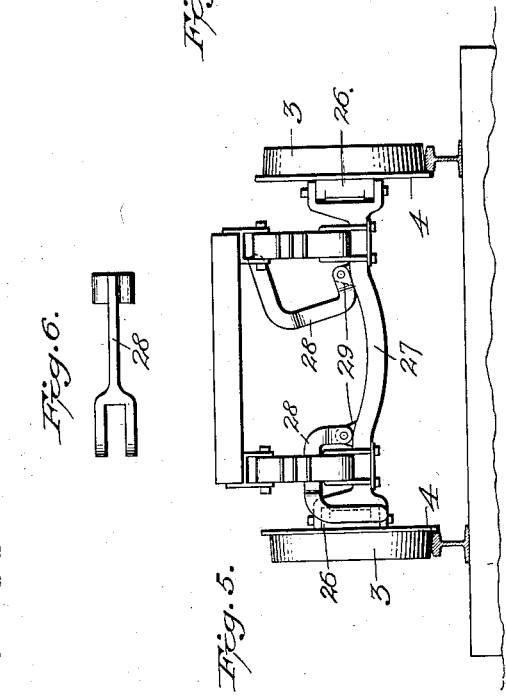
Witnesses:
G. Sargent Elliott.
Adella M. Fowle
Inventor:
By Ambrose C. G. Williams-Foote
H. S. Bailey.
Attorney

UNITED STATES PATENT OFFICE.

AMBROSE C. G. WILLIAMS-FOOTE, OF DENVER, COLORADO.

CONVERTIBLE WHEEL FOR MILITARY AND OTHER TRUCKS.

1,110,307.   Specification of Letters Patent.   Patented Sept. 8, 1914.

Application filed August 12, 1913.   Serial No. 784,450.

*To all whom it may concern:*

Be it known that I, AMBROSE C. G. WILLIAMS-FOOTE, a citizen of the United States of America, residing at the city and county of Denver and State of Colorado, have invented a new and useful Convertible Wheel for Military and other Trucks, of which the following is a specification.

My invention relates to improvements in convertible wheels for military and other trucks; and the objects of my invention are: First, to provide a convertible wheel for military and other trucks, which is adapted for use either on roadways or railways. Second, to provide a car wheel of the standard type, with a felly and tire supporting frame. which may be easily and quickly attached thereto to equip the truck for road service, or as easily and quickly detached to enable the truck to be transported over a railway, the felly and supporting frame being always intact, so that the same may be conveniently stowed away in any convenient part of the truck when not in use. And third, to provide an attachment in the form of a supplemental wheel for car wheels, consisting of a felly supporting frame comprising a felly supporting portion adapted to fit over the tread and flange of the wheel, and a hub connected thereto by spokes, said hub being adapted to fit over the car wheel hub, the said supporting frame being secured to the wheel by bolts.

I attain these objects by the mechanism illustrated in the accompanying drawings, in which:

Figure 1, is a vertical sectional view of a car wheel equipped with my improved roadway attachment. Fig. 2, is a rear side view of the attachment removed from the car wheel, a portion only of the felly being shown in connection therewith. Fig. 3, is a front side view of the attachment. Fig. 4, is a side view of a truck provided with the improved convertible wheels, a track and the tread portions of the wheel being shown in dotted lines. Fig. 5, is a front end view of the frame and wheels of a truck mounted on the ordinary car wheels after the attachments have been removed to adapt the truck for railway use, the forward axle being provided with locking arms which prevent guiding movement of the wheels, when the truck is in such use. Fig. 6, is a plan view of one of the locking arms. Fig. 7, is a sectional view illustrating the attachment arranged for a broad felly, when greater traction area is required. And Fig. 8, is a sectional view illustrating the felly equipped with a pneumatic tire.

Similar letters of reference refer to similar parts throughout the several views.

Referring to the drawings,—The numeral 1 designates the hub portion, 2 the solid flange portion, 3 the tread, and 4 the rail flange portion, of the common form of cast railway car wheel. This car wheel is made and adapted to run on the railway rails of railroads, and the wheels are mounted in any operative manner on axles, which may be of any kind or character. My convertible wheel has been especially invented to be used on military trucks, although it can be used on trucks and other vehicles for special use on special occasions, for instance in case it is desired to transport a motor fire engine, such as used in cities, to another city. A set of the wheels can be converted into rail wheels and applied to the axles of the motor fire ruck. and the motor fire truck could be run by rail to the city where it is desired to use it. The wheels could then be converted in a few minutes into wagon road wheels, and then the motor fire engine could be taken from the railroad and be driven over wagon roads wherever desired.

The wagon road mechanism of my convertible wheel comprises a hub portion 7, which is adapted to fit on the hub of the railroad wheel. Any suitable connection may be made between the two hubs. I preferably however provide the hub of the railroad wheel with a machine finished tapering surface, that tapers larger in diameter from the end of the inner edge of the hub divergingly toward the web flange of the wheel, and the hub of the supplemental or roadway wheel is provided with a tapering bore 8. that is arranged to fit over and onto the tapering surface of the hub of the railroad wheel. A plurality of spokes 9 radiate from the hub of the wheel, in preferably a straight plane, to a stepped rim portion 10, that fits against the under side of the rim of the track wheel that forms an integral part of a straight flange portion 11, which is arranged and adapted to form the inside supporting plate of a felly 15. The inside surface of this flange is provided with a laterally projecting cylindrical rim portion 12, the inner peripheral wall of which is arranged and adapted to fit the contour of the rail treading surface, and the rail flange surface of the railroad wheel, with a firm bearing fit. This rim extends over the top of the track flange and projects above it, in a short rim flange portion 14, which is arranged flush with the inside face of the flange portion of the railroad wheel, and its outer edge is preferably of the same radial diameter as the flange 11, and between this rim flange 14 and the flange 11, a felly 15 is placed, the inner peripheral wall of which is arranged and adapted to fit firmly against the contour of the adjacent surface of the cylindrical rim portion of the wagon road wheel, and is secured rigidly to the flanges 11 and 14, by a circular row of bolts 16, which are extended transversely through these flanges and the felly. This felly may be of any suitable material and of any suitable thickness, and it preferably extends beyond the flanges and upon its periphery an iron or steel tire 17 is shrunk and secured in the usual manner.

A plurality of radially disposed plates 18 are placed in recesses in the faces of the inside face of the rim of the track wheel, and are made long enough to extend over the side of and to fit into recesses in the rim 14, and the bolts 16 extend through their outer ends and clamp them to the rim 14. The flange portion 11 of the road wheel is rigidly clamped and bolted to the track wheel by a circular row of bolts 19, which extend through the flange 11, and the rim of the track wheel, and the inner ends of the plates 18, and these bolts 19 clamp the road wheel rigidly to the track wheel.

In Fig. 4 is illustrated a side view of a truck, the wheels thereof being arranged for roadway use, and while the fellies are shown provided with the ordinary iron tires 17, the invention contemplates the use of pneumatic tires 20, as shown in Fig. 8. When such tires are employed, a felly 21 is used, which need only extend flush with the circumferential edges of the flanges 11 and 14, and any suitable form of clincher rim 22 may be used for securing the tire to the felly. The air tube 23, in this case, is curved, as shown, and the felly is provided with a correspondingly curved aperture 24, which extends out through the lower outer corner thereof, the flange 11 being provided with a registering aperture 25, which receives the cap 25ᴬ of the air tube, and permits the removal of the same when the tire is to be unflated. This feature, however, forms no part of the present invention.

When the truck is arranged for traveling on railway tracks, as shown in Fig. 5, it is essential that the pivotal members 26 of the forward axle, upon which the wheels are mounted, should be locked rigid with the main portion 27 of the axle, so as to eliminate the possibility of the truck being derailed by the turning or swinging of said pivotal members 26. To accomplish this, the axle is equipped with a pair of substantially U-shaped arms 28, the upright members of each being of unequal length, and are bifurcated or yoke-shaped. The shorter member of each arm is pivoted to a lug 29, formed on the axle 27, while the longer members are adapted to be swung over, so as to straddle the outer ends of the axle, and the members 26, which are pivotally mounted in the ends of the axle in the usual manner. By this means, the members 26 are held rigid with the axle, as will be understood by reference to Fig. 5, and when the truck is arranged for roadway service, the arms 28 may be swung inward toward each other, and secured in an inoperative position, in any suitable manner, thus leaving the pivotal members 26 free to be turned in steering the truck.

The truck may also be equipped with a pair of jacks, by which it may be raised and supported in changing the form of the wheels. These jacks are preferably secured to the under side of the chassis of the truck adjacent to its opposite ends, and comprise suitable stationary uprights 29, in which are rotatably mounted screw rods 30, which may be manually turned, but which as illustrated, are each provided with a gear wheel 31, on its upper end, which meshes with a pinion 32, mounted on a shaft 33, which may be driven in any suitable manner from the crank shaft of the engine. A follower block 34, is mounted on each screw rod, and to the opposite side of this block is pivotally connected the yoke-shaped end of a standard 35, the opposite end of which is provided with a supporting foot 36, which is adapted to rest on the ground when the truck is to be raised and supported. When the screw is turned in one direction, the truck is raised, and when turned in the reverse direction the truck is lowered, as will be understood by reference to Fig. 4. When the jacks are not in use, they are swung up and held beneath the truck so as to be out of the way.

I have illustrated the truck provided with the jacks, and with the locking arms for the forward axle, in order to convey an idea of the equipment essential in the practical use of a truck of this character, it being understood that these features form no part of the present invention.

In Fig. 7, is illustrated a supplemental or roadway wheel, adapted for sandy or muddy roads, where greater traction area is necessary than on solid roads; in this wheel the felly 37 is about twice the width of that shown in Fig. 1. In order to provide for a felly of this width, the rim portion 38 of the supporting frame is extended beyond the outer face of the truck wheels a distance sufficient to provide for the additional width, and this extended portion of the rim is supported by a plurality of spokes 39, which are integral with the extension and with the hub 40 of the frame, one of these spokes being shown in Fig. 7.

The side flanges 41 and 42, which project from the rim 38, are similar in all respects to the flanges 11 and 14 of Fig. 1, and bolts 43 and 44 and plates 45 perform the same functions in this form of the invention, as do the bolts 16 and 19 and plates 18 respectively, of Fig. 1. The spokes 39 are provided with elongated openings 46, through which the fingers of an attendant may be inserted in detaching and replacing the said supplemental or roadway wheel.

The convertible wheel herein described constitutes a practical truck wheel, and one particularly adapted for military service, where conditions are frequently such that only with wheels of this character can trucks be enabled to render efficient service.

Having described my invention, what I claim as new, and desire to secure by Letters Patent, is:

1. A convertible wheel as specified, comprising a track wheel, a roadway wheel surrounding the same and having a hub adapted to fit upon the track wheel hub, and means for removably securing the roadway wheel to the track wheel.

2. In a convertible wheel as specified, the combination with a track wheel, of a roadway wheel having a band portion which surrounds and rests upon the tread portion of said track wheel, and a hub connected with said band portion adapted to surround the hub of the track wheel, and means for removably securing the roadway wheel to the track wheel.

3. In a convertible wheel as specified, the combination with a track wheel, of a roadway wheel comprising an annular flanged band surrounding the tread of the track wheel, a hub which surrounds the track wheel hub, and spokes connecting said band and surrounding hub, a felly supported by the flanged band, a tire on said felly, and bolts for removably securing the roadway wheel to the track wheel.

4. In a convertible wheel as specified, the combination with a track wheel surrounding the same, comprising a flanged metal band of a form to surround the tread and flange of said track wheel, an annular housing surrounding and inclosing the outer edge of the track wheel rim, a hub surrounding the track wheel hub, and integral spokes connecting the said surrounding hub and the annular housing, a felly supported by said flanged rim and having a tire thereon, bolts which pass through the flanges of said rim and through the felly, and bolts which pass through the tread rim of said track wheel and through the end wall of said annular housing.

5. In a convertible wheel as specified, the combination with a track wheel, of a frame, comprising a flanged band which surrounds the tread and flange of said track wheel, a hub which surrounds the track wheel hub and integral spokes which connect said surrounding hub and flanged band, a felly supported by said flanged rim, having a tire thereon, radial plates disposed at regular intervals over the inner face of said track wheel, and the inner flange of said flanged band, bolts which pass through the outer ends of said plates, the said flanges and the felly, and bolts which pass through the inner ends of said plates, the rim of said track wheel, and the said frame.

In testimony whereof I affix my signature in presence of two witnesses.

AMBROSE C. G. WILLIAMS-FOOTE.

Witnesses:
G. SARGENT ELLIOTT,
ADELLA M. FOWLE.